(12) United States Patent
Hu

(10) Patent No.: US 8,561,630 B2
(45) Date of Patent: Oct. 22, 2013

(54) DUAL GAS SOURCE CHANGEOVER VALVE AND CONTROL CABINET AND GAS SUPPLY SYSTEM

(75) Inventor: Yuegang Hu, Shanghai (CN)

(73) Assignee: Gentec (Shanghai) Corporation, Shanghai (CN)

( * ) Notice: Subject to any disclaimer, the term of this patent is extended or adjusted under 35 U.S.C. 154(b) by 331 days.

(21) Appl. No.: 12/874,218

(22) Filed: Sep. 1, 2010

(65) Prior Publication Data
US 2011/0061752 A1    Mar. 17, 2011

(30) Foreign Application Priority Data

Sep. 2, 2009  (CN) .......................... 2009 1 0171746

(51) Int. Cl.
*F16K 11/02*    (2006.01)
(52) U.S. Cl.
USPC .......................................... 137/113; 137/557
(58) Field of Classification Search
USPC ................. 137/102, 112, 113, 625.6, 625.64, 137/625.67, 625.68, 553, 557
See application file for complete search history.

(56) References Cited

U.S. PATENT DOCUMENTS

| | | | | |
|---|---|---|---|---|
| 6,257,268 B1 * | 7/2001 | Hope et al. | ..................... | 137/112 |
| 6,318,400 B1 * | 11/2001 | Hope et al. | ..................... | 137/112 |
| 7,013,906 B2 * | 3/2006 | Pearson | ........................ | 137/113 |
| 7,159,605 B2 * | 1/2007 | Thrash et al. | .............. | 137/15.21 |
| 7,243,671 B2 * | 7/2007 | Thrash et al. | ................ | 137/112 |
| 2005/0028864 A1 * | 2/2005 | Thrash et al. | ................ | 137/112 |
| 2007/0102042 A1 * | 5/2007 | Thrash et al. | ................ | 137/112 |

* cited by examiner

*Primary Examiner* — Craig Schneider

(57) ABSTRACT

A dual gas source changeover valve comprises a valve body having a first inlet port, a second inlet port and an outlet port which are all in fluid communication with each other, a spool having a structure relative to an axial passage of the cavity of the valve body and which is slidably disposed therein, a first transition cavity formed by the cavity of the valve body and the spool between the first inlet port and the outlet port, a second transition cavity disposed opposite to the first transition cavity and formed between the second inlet port and the outlet port. By introducing delivered gas to the first transition cavity or the second transition cavity through connection channels, the present invention selectively connects or disconnects the first inlet port, the first transition cavity and the outlet port or the second inlet port, the second transition cavity and the outlet port.

16 Claims, 16 Drawing Sheets

DUAL GAS SOURCE CHANGEOVER VALVE AND CONTROL CABINET AND GAS SUPPLY SYSTEM

BACKGROUND OF THE INVENTION

The present invention relates to a changeover valve and a control cabinet with the changeover valve and a dual gas source gas supply system and more particularly pertains to a changeover valve which attains automatic gas supply switching when the pressure differential of the gas sources at the two sides reaches a predetermined value, and a control cabinet and a dual gas source gas supply system with the changeover valve.

Uninterrupted gas supply is required for gas supply systems in many fields such as the industrial field and medical field. The types and pressure levels of the supplied gas vary. For example, common gas types are oxygen, hydrogen, nitrogen, argon, helium, carbon dioxide gas, ethyne, propane and others. Pressure levels can be categorized into high, medium and low pressures, such as 15 MPa, 10 MPa, 6 MPa, 2.5 MPa, 1.5 MPa and others. To attain uninterrupted gas supply, two gas sources are usually utilized. One of the gas sources is the primary bank and the other is the reserve bank. When the pressure of the primary bank decreases to a predetermined value, the gas source of the gas supply will be switched, i.e. the reserve bank starts to supply gas and becomes the primary bank, and the original primary bank becomes the reserve bank. Uninterrupted gas supply to the output end is attained by repeated switching as above.

There are two operating conditions for switching from one gas source to another, namely semi automatic operation with relief valves at the two sides and automatic operation with relief valves and solenoid valves at the two sides. FIG. 15 shows the gas supply for a common semi automatic operation with relief valves at the two sides. FIG. 16 shows the gas supply for a common automatic operation with relief valves and solenoid valves at the two sides.

As illustrated in FIG. 15, a dual gas source gas supply system comprises: a first gas source 10a and a second gas source 10b, a first relief valve 31a and a second relief valve 31b, a first check valve 32a and a second check valve 32b, a tee union 40 and an outlet relief valve 41. The first gas source 10a comprises one or more than one gas vessels 11a, 12a and 13a connected to a collecting pipe 20a, a shutoff valve 21a and a first filter 22a. The second gas source 10b also comprises one or more than one gas vessels 11b, 12b and 13b connected to a collecting pipe 20b, a shutoff valve 21b and a second filter 22b. The first collecting pipe 20a collects gas from the first gas source 10a which successively passes through the first shutoff valve 21a, the first filter 22a and the first relief valve 31a to attain primary pressure reduction, and thereafter successively passes through the first check valve 32a, the tee union 40 and the outlet relief valve 41 to attain secondary pressure reduction, thereby supplying gas to the output end. Similarly, the second collecting pipe 20b collects gas from the second gas source 10b which successively passes through the second shutoff valve 21b, the second filter 22b and the second relief valve 31b to attain primary pressure reduction, and thereafter successively passes through the second check valve 32b, the tee union 40 and the outlet relief valve 41 to attain secondary pressure reduction, thereby supplying gas to the output end. The difference is that when the two sides are connected to the gas sources, if the first gas source 10a is the primary bank, the output pressure of the first relief valve 31a needs to be manually raised for a certain degree and the output pressure of the second relief valve 31b needs to be manually lowered for a certain degree to become the reserve bank. When the first gas source 10a is used and its pressure level decreases to the output pressure level of the second relief valve 31b, the second gas source 10b starts to supply gas. The first gas source 10a can then be replaced with a new gas source. Before the gas source is replaced, the output pressure of the first relief valve 31a needs to be manually lowered for a certain degree to become the reserve bank. The output pressure of the second relief valve 31b needs to be manually raised for a certain degree to become the primary bank. The check valves prevent backflow of gas when the primary bank and the reserve bank switch between each other. When the requirement for pressure stability of the output pressure of the output end is not high and the usage demand can be fulfilled after the gas pressure is reduced by the first relief valve 31a or the second relief valve 31b, the outlet relief valve 41 can be omitted.

FIG. 16 illustrates a supply system established based on the system shown in FIG. 15, with the addition of a first solenoid valve 33a and a second solenoid valve 33b. A first pressure relay 34a is also installed at the inlet port of the first relief valve 31a and a second pressure relay 34b is installed at the inlet port of the second relief valve 31b. The pressure relays and the solenoid valves are electrically connected through an electric cabinet 35. The first solenoid valve 33a and the second solenoid valve 33b are reverse lockout solenoids so that only one solenoid at one side operates at one time. The pressure setting of the pressure relays is the lowest working pressure of the gas sources. The output pressures of the first relief valve 31a and the second relief valve 31b are the same. When the two sides are connected to the gas sources, a user manually switches on one side to supply gas at the electric cabinet. If the first solenoid valve 33a is connected first, the first gas source 10a is the primary bank, and the second solenoid valve 33b is not connected and the second gas source 10b is the reserve bank. When the first gas source 10a nearly depletes and its pressure decreases to the lowest working pressure of the gas source, the pressure relay 34a is activated and switches off the solenoid valve 33a. The solenoid valve 33b also becomes connected. A signal for gas exchange may also be released to notify the user the need to replace the gas source. The second gas source 10b becomes the primary bank and the first gas source 10a becomes the reserve bank after a new gas source is replaced. This allows switching of gas supply without the need to adjust the output pressure of the first relief valve 31a or the second relief valve 31b. The switching takes places repeatedly to attain automatic gas supply. The check valves prevent backflow of gas after the gas sources deplete. When the requirement for pressure stability of the output pressure of the output end is low and the usage demand can be fulfilled after the gas pressure is reduced by the first relief valve 31a or the second relief valve 31b, the outlet relief valve 41 can be omitted.

When FIG. 15 and FIG. 16 are compared with each other, the semi automatic manifold with relief valves at the two sides depicted in FIG. 15 is relatively simple. However, adjustment has to be made manually when replacing the gas sources after switching and it is not easy to master the skill. Gas may also be supplied from both sides at the same time, therefore failing the purpose of having one primary bank and one reserve bank at the same time. The automatic manifold with relief valves and solenoid valves at the two sides depicted in FIG. 16 does not require manual operation to attain automatic switching except when gas sources are to be replaced. However, solenoid valves and control means for controlling the solenoid valves have to be installed. Apart from increased costs, there are disadvantages as follows: a. the manifold is electricity dependent; b. it can only be operated if the output pressure is not high and it is not easy to control the solenoid valves if the pressure is high; c. explosion prevention measures have to be caused at flammable work stations and there exist potential safety hazard; d. controls have to be administered at various parts and the failure rate is high.

BRIEF SUMMARY OF THE INVENTION

In view of the aforesaid disadvantages now present in the prior art, the present invention provides a dual gas source changeover valve which attains automatic gas supply switching using the pressure differential of the two gas sources.

The present invention also provides a control cabinet with a changeover valve.

The present invention also provides a dual gas source gas supply system with a changeover valve.

To attain this, the present invention generally comprises a valve body having a Tee housing with a T-shaped cavity, which comprises a first inlet port, a second inlet port axially disposed opposite to the first inlet port, and an outlet port perpendicularly disposed in middle of the axially disposed first inlet port and second inlet port, where the first inlet port, the second inlet port and the outlet port are in fluid communication; a spool having a structure relative to an axial passage of the cavity of the valve body between the first inlet port and the second inlet port, and which is slidably disposed within the valve body; characterized in that the cavity of the valve body comprises a large-section cavity in middle, a first valve body contraction segment and a second valve body contraction segment axially disposed opposite to the first valve body contraction segment, where the first valve body contraction segment and the second valve body contraction segment are small-section cavities which are co-axially disposed at and outwardly protrude from two ends of the large-section cavity respectively; the spool comprises a large-section cylindrical body in middle which has a cross section relative to the large-section cavity and axial dimensions smaller than axial dimensions of the large-section cavity; a first small-section segment and a second small-section segment which are co-axially disposed at and outwardly protrude from two ends of the large-section cylindrical body respectively have cross sections relative to the first valve body contraction segment and the second valve body contraction segment and axial dimensions which allow them to be disposed within the first valve body contraction segment and the second valve body contraction segment at any position inside the axial passage of the cavity; characterized in that end surfaces of the cavity of the valve body and the large-section cylindrical body of the spool form a first transition cavity between the first inlet port and the outlet port and a second transition cavity opposite to the first transition cavity and between the second inlet port and the outlet port; delivered gas is introduced into or discharged from the first transition cavity or the second transition cavity in order to control pressures of the two transition cavities, so that the pressure received by the spool changes and its position quickly changes.

The present invention may also comprise at least one inlet air-tight seal disposed at each side between the first transition cavity and the first inlet port and between the second transition cavity and the second inlet port; at least one inlet connection channel disposed at each side between the first inlet port and the first transition cavity and between the second inlet port and the second transition cavity. It is characterized in that when the spool is at a predetermined position, the inlet connection channel on a side passes over the inlet air-tight seal on that side so that the inlet port on that side connects to the transition cavity on that side, and the inlet connection channel on an other side disconnects the inlet port on the other side from the transition cavity on that other side by means of the inlet air-tight seal on that other side.

The present invention also comprises at least one outlet air-tight seal disposed at each side between the first transition cavity and the outlet port and between the second transition cavity and the outlet port; at least one outlet connection channel disposed at each side between the outlet port and the first transition cavity and between the outlet port and the second transition cavity. It is characterized in that when the spool is at a predetermined position, the outlet connection channel on a side passes over the outlet air-tight seal on that side so that the outlet port on that side connects to the transition cavity on that side, and the outlet connection channel on an other side disconnects the outlet port on that other side from the transition cavity on that other side by means of the outlet air-tight seal on that other side.

Under the pressure differential action of the inlet gas on the two sides, when the spool of the present invention slides within the valve body to a predetermined position, the inlet connection channel on one side connects the inlet port and the transition cavity on that side, thereby expanding the pressure differential of the transition cavities on the two sides so that the spool quickly moves and thereafter the transition cavity on that side connects to the outlet port through the outlet connection channel. Making use of the pressure differential of the inlet gas on the two sides, the present invention selectively connects or disconnects the first inlet port, the first transition cavity and the outlet port or the second inlet port, the second transition cavity and the outlet port.

The present invention can also operates as follows: under the pressure differential action of the inlet gas on the two sides, when the spool of the present invention slides within the valve body to a predetermined position, the outlet connection channel of a side connects the outlet port and the transition cavity on that side, thereby expanding the pressure differential of the transition cavities on the two sides so that the spool quickly moves and thereafter the transition cavity on that side connects to the inlet port of that side through the inlet connection channel. Making use of the pressure differential of the inlet gas on the two sides, the present invention selectively connects or disconnects the first inlet port, the first transition cavity and the outlet port or the second inlet port, the second transition cavity and the outlet port.

The present invention also comprises at least one auxiliary air-tight seal disposed between the transition cavities and the outlet air-tight seals of the two sides; the valve body between the outlet air-tight seals and the auxiliary air-tight seals of the two sides comprises a first external control passage and a second external control passage connecting to an external environment; the transition cavity connects to the external control passage of that side after it is disconnected from the outlet port.

The present invention also comprises connection channels of the external control passages which connect the first external control passage and the second external control passage respectively to an external gas discharge means or recovery means, thereby expanding the pressure differential of the transition cavities of the two sides.

The present invention may also comprise a gas switching regulation means which selectively connects the first transition cavity and the second transition cavity to the outlet port or to the external discharge means (recovery means). The pressure differential of the transition cavities of the two sides is controlled by external pressure, thereby selectively connecting or disconnecting the first inlet port, the first transition cavity and the outlet port or the second inlet port, the second transition cavity and the outlet port.

The present invention may also comprise an operation indication means which indicates gas switching state; the valve body also comprises a first operation indication passage connecting the first transition cavity to a side of the operation indication means and a second operation indication passage connecting the second transition cavity to an other side of the operation indication means.

In the present invention, the outlet connection channels can be disposed in a manner that they extend from a first end surface and a second end surface of the large-section cylindrical body of the spool respectively to periphery of the large-section cylindrical body of the spool.

In the present invention, the inlet connection channels can be disposed in a manner that they extend from ends of the two small-section segments of the spool respectively to periphery of the small-section segments.

In the present invention, the inlet connection channels can also be disposed in a manner that they extend from the first inlet port and the second inlet port to the respective transition cavity on the same side through the valve body.

In the present invention, the spool and the cavity of the valve body have cross sections in shape of circle.

The present invention also provides a control cabinet for dual gas source gas supply which comprises the dual gas source changeover valve of any one of the embodiments of the present invention.

The present invention also provides a dual gas source gas supply system which comprises the dual gas source changeover valve of any one of the embodiments of the present invention.

DETAILED DESCRIPTION OF THE INVENTION

Figure 1:
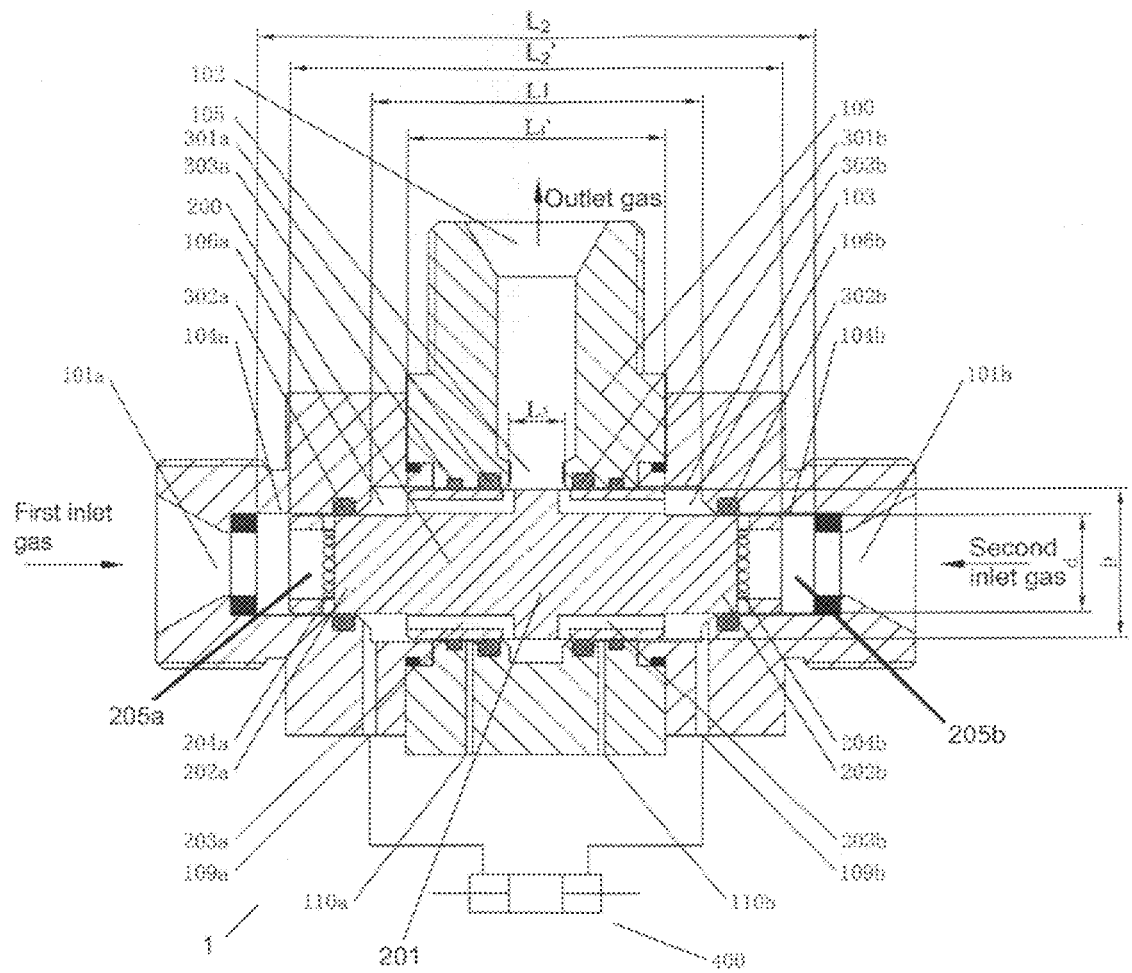
FIG. 1 shows the schematic cross sectional view of the basic structure of the dual gas source changeover valve according to the first embodiment of the present invention.

The embodiments of the present invention will be described in detail in the following paragraphs with reference to the drawings. The same reference numbers in the drawings refer to the same components or parts throughout this specification.

FIG. 1 shows the cross sectional view of the basic structure of the dual gas source changeover valve 1 according to the first embodiment of the present invention. The valve is not connected to the pressure gas source and the spool is at the middle or at any other position.

As illustrated in FIG. 1, the dual gas source changeover valve 1 of the first embodiment of the present invention comprises a valve body 100, a spool 200 disposed within the valve body 100 to slide axially therein and a plurality of sealing components disposed on the coupling surfaces of the valve body 100 and the spool 200. According to the first embodiment of the present invention, the dual gas source changeover valve 1 can also comprise an operation indication means 400.

The valve body 100 is a hollow Tee housing which comprises a first inlet port 101a, a second inlet port 101b and an outlet port 102, which form an inverted "T" shape. That is, the valve body cavity with variable cross sections connects the first inlet port 101a, the second inlet port 101b and the outlet port 102 in fluid communication. The valve body cavity is for example a cylindrical cavity with variable circumferences which is relative and symmetric to an outlet axis, and the two ends of which are respectively disposed with contraction segments. More specifically, the valve body cavity comprises a large-section cavity 103, a first small-section cavity 104a and a second small-section cavity 104b. The first small-section cavity 104a and the second small-section cavity 104b are disposed relative and symmetric to the outlet axis on the two ends of the large-section cavity 103. However, the valve body cavity of the present invention is not restricted to the above structure. The large-section cavity 103 and the small-section cavities 104a and 104b may also be connected by arc transition, steps, reducing conical circumferences or others. The large-section cavity 103 has a diameter of D (positive allowance) and a length of $L_1$; the outlet channel has a width of $L_3$; both diameters of the first small-section cavity 104a and the second small-section cavity 104b are for example d (positive allowance), and the distance between the end surfaces of the two ends of the first small-section cavity 104a and the second small-section cavity 104b, i.e. the total axial length of the valve body cavity, is $L_2$.

The spool 200 is for example a cylindrical shaft with steps. The spool 200 comprises a large-section segment 201 having two ends, and the two ends are disposed with a first small-section segment 202a and a second small-section segment 202b respectively. That is, the spool 200 comprises the large-section segment 201, the first small-section segment 202a and the second small-section segment 202b. The first small-section segment 202a and the second small-section segment 202b both have smaller diameters and outwardly protrude from the two ends of the large-section segment 201 in a co-axially symmetrical manner. However, the spool of the present invention is not restricted to the above structure. The large-section segment 201 and the small-section segments 202a and 202b may also be connected by arc transition, steps, reducing conical circumferences or others. The large-section segment has a diameter of D (negative allowance) which is relative to the diameter of the large-section cavity 103 of the valve body 100, and a length of $L_1'$ ($L_1'<L_1$); the diameters of the first small-section segment 202a and the second small-section segment 202b are also d (negative allowance) and are relative to the diameters of the first small-section cavity 104a and the second small-section cavity 104b. The total length of the spool 200 is $L_2'$ ($L_2'<L_2$).

The spool 200 is disposed relative to the cavity of the valve body 100 and the spool 200 is disposed within the cavity of the valve body 100 to slide axially therein. The transition areas of the large sections and the small sections of the valve body 100 and the spool 200 form the first transition cavity (transition cavity) 106a and the second transition cavity (transition cavity) 106b.

As illustrated in FIG. 1, in order to isolate the first inlet port 101a, the first transition cavity 106a and the outlet channel 105 from each other, a first inlet sealing ring 302a, a first outlet sealing ring 301a and a first auxiliary outlet sealing ring 303a which are all air-tight are disposed both between the first inlet port 101a and the first transition cavity 106a and between the first transition cavity 106a and the outlet channel 105. Similarly, in order to isolate the second inlet port 101b, the second transition cavity 106b and the outlet channel 105 from each other, a second inlet sealing ring 302b, a second outlet sealing ring 301b and a second auxiliary outlet sealing ring 303b which are all air-tight are disposed both between the second inlet port 101b and the second transition cavity 106b and between the second transition cavity 106b and the outlet channel 105.

At least one first inlet connection channel 204a and at least one second inlet connection channel 204b are respectively disposed on the two end surfaces of the first small-section segment 202a and the second small-section segment 202b of the spool 200. Their inlet ports can be disposed at the terminals of the first small-section segment 202a and the second small-section segment 202b respectively, and their outlet ports are disposed on the outer circumferential surfaces of the first small-section segment 202a and the second small-section segment 202b respectively, and they are in "L" shape. The inlet connection channels on the same side join at their terminals to form a first inlet recess 205a or a second inlet recess 205b.

Further, the two end surfaces of the large-section segment 201 of the spool 200 are disposed with a first outlet connection channel 203a and a second outlet connection channel 203b which both connect to the circumference of the large-section segment 201 of the spool 200 respectively. The first outlet connection channel 203a and the second outlet connection channel 203b are also disposed relative and symmetric to the outlet axis, for example being in "L" shape.

As illustrated in FIG. 1, when the spool 200 slides within the valve body 100 to the right end of the axis, the first inlet port 101a, the first transition cavity 106a and the outlet channel 105 become in fluid communication as the first inlet connection channel 204a and the first outlet connection channel 203a pass over their respective sealing rings (301a, 302a, 303a), and the second transition cavity 106b, the second inlet port 101b and the outlet channel 105 are isolated from each other by their respective sealing rings (301b, 302b, 303b). Similarly, when the spool 200 slides within the valve body 100 to the left end of the axis, the second inlet port 101b, the second transition cavity 106b and the outlet channel 105 become in fluid communication as the second inlet connection channel 204b and the second outlet connection channel 203b pass over their respective sealing rings (301b, 302b, 303b), and the first transition cavity 106a, the first inlet port 101b and the outlet channel 105 are isolated from each other by their respective sealing rings (301a, 302a, 303a). Therefore, the first gas source and the second gas source supply gas separately. In this embodiment, when the spool 200 is at the middle of the cavity of the valve body 100, the inlet gas flow of the first inlet connection channel 204a and the second inlet connection channel 204b is stopped and the first outlet connection channel 203a and the second outlet connection channel 203b respectively connect the first transition cavity 106a and the second transition cavity 106b with the outlet port.

To attain the gas switching function of the spool 200 in the valve body 100, the moving distance of the spool 200 within the valve 100 equals to $L_2-L_2'$ or $L_1-L_1'$, whichever is smaller, and the distance is not less than the sum of the width of the first and second outlet or inlet sealing rings (301a, 301b or 302a, 302b) and the axial width of the outlet port of the first and second outlet or inlet connection channels (203a, 203b or 204a, 204b). The width of the outlet channel $L_3$ is not less than the sum of half the moving distance of the spool and the axial width of the outlet port of the first or second outlet connection channel (203a, 203b).

To enable a user to observe which gas source is supplying gas (i.e. connected to the outlet channel) from an external environment, a first operation indication terminal 109a and a second operation indication terminal 109b connected to the external environment may be disposed on the respective transition cavities at the two ends of the large-section cavity of the valve body 100. These terminals connect to the two ends of the operation indication means 400.

To ensure reliable positioning of the spool after gas switching, a first control terminal 110a and a second control terminal 110b which are both connected to the external environment are respectively disposed between the first outlet sealing ring 301a and the first auxiliary outlet sealing ring 303a and between the second outlet sealing ring 301b and the second auxiliary outlet sealing ring 303b. The transition cavities (106a, 106b) are selectively connected to external discharge means or recovery means, thereby releasing the pressure of the transition cavity of the disconnected side.

Figure 2:
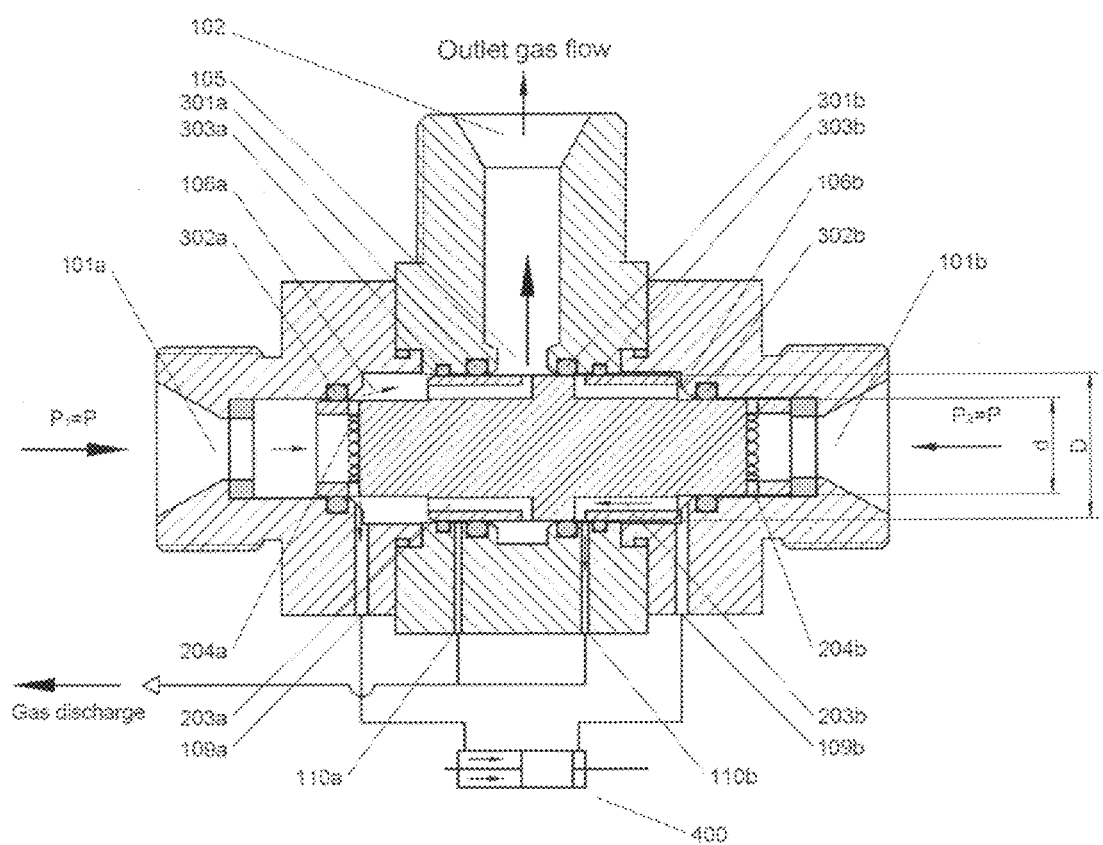
FIG. 2 shows the cross sectional view of the operating state of the gas supply of one side of the dual gas source changeover valve according to the first embodiment of the present invention.

FIG. 2 shows the cross sectional view of the startup state of the changeover valve 1 according to the first embodiment of the present invention.

First, for the sake of easy description, gas supplied from the first gas source to the changeover valve is described. Similar mechanism applies to the second side.

As illustrated in FIG. 1 and FIG. 2, the first inlet gas flow passes through the first inlet port 101a and enters the valve body 100, and its operating pressure is $P_1$. At this moment, the operating pressure $P_1$ of the first gas inlet gas flow is equal to the initial pressure P of the gas source ($P_1$=P). Under the action of the first inlet gas flow pressure $P_1$, the spool 200 quickly slides to the right side (the second side). The first inlet gas flow passes through the first inlet port 101a, the first inlet connection channel 204a, the first transition cavity 106a, the first outlet connection channel 203a, the outlet channel 105 and outputs from the outlet port 102. The first gas source which is connected first starts to supply gas. Thereafter, the second side connects to the pressure gas source and its pressure $P_2$ is now equal to the initial pressure P of the gas source. The second inlet connection channel 204b and the second outlet connection channel 203b on the right do not connect the second transition cavity 106b and the second inlet port 101b to the outlet port 102. The second inlet port 101b and the outlet port 102 are therefore disconnected. As illustrated in FIG. 2, the action area of the pressure of the latter connected second side towards the spool 200 is the small-section segment end surface area $\pi d^2/4$, and the action area of the pressure of the first connected first side towards the spool 200 is the large-section segment end surface area $\pi D^2/4$. The resultant force towards the spool 200 is approximately $P\pi(D^2-d^2)/4$. The resultant force remains towards the right. The spool 200 remains at the second side (the right side). The first side continues to supply gas and the second side does not supply gas temporarily as the reserve bank.

As illustrated in FIG. 1 and FIG. 2, the valve body 100 may also comprise the first operation indication terminal 109a which connects the first transition cavity 106a and one end of the operation indication means, and the second operation indication terminal 109b which connects the second transition cavity 106b and the other end of the operation indication means. The valve body 100 also comprises a first control terminal 110a which selectively connects the first transition cavity 106a to the external environment and a second control terminal 110b which selectively connects the second transition cavity 106b to the external environment.

As illustrated in FIG. 2, the first operation indication terminal 109a outputs pressure instructions from the first transition cavity 106a and the first control terminal 110a is disconnected. The second outlet connection channel 203b connects the second transition cavity 106b and the second control terminal 110b. The second control terminal 110b receives zero pressure and the second operation terminal 109b outputs zero pressure.

Since the output pressures of the operation indication terminals of the two sides are different, the gas supply side could be indicated when the two operation indication terminals connect to the operation indication means 400. When the first transition cavity 106a is filled with gas, the second transition cavity 106b is empty. Therefore, the operation indication means 400 shows that the first inlet gas flow is supplying gas and the second inlet gas flow is not supplying gas.

Figure 3:
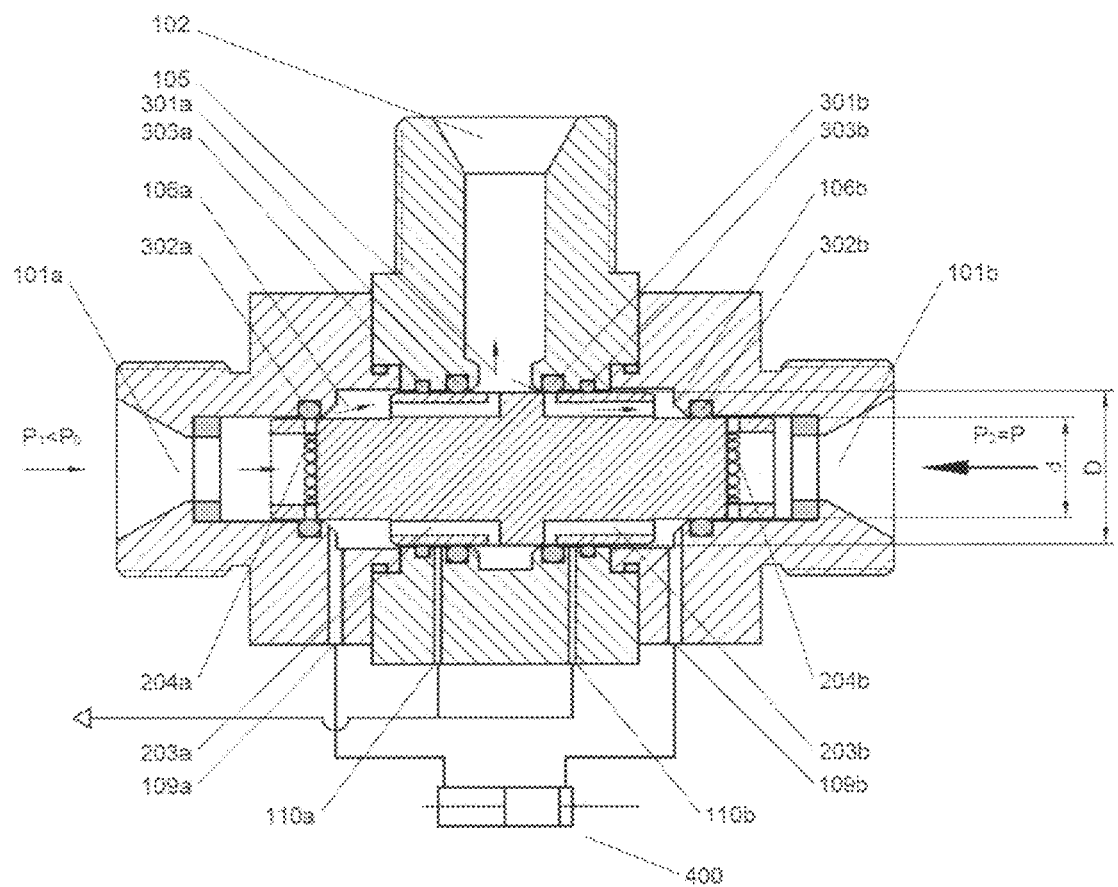
FIG. 3 shows the cross sectional view of the switch initiation state of the dual gas source changeover valve according to the first embodiment of the present invention.

FIG. 3 shows the cross sectional view of the switch initiation state of the changeover valve 1 according to the first embodiment of the present invention.

Figure 15:
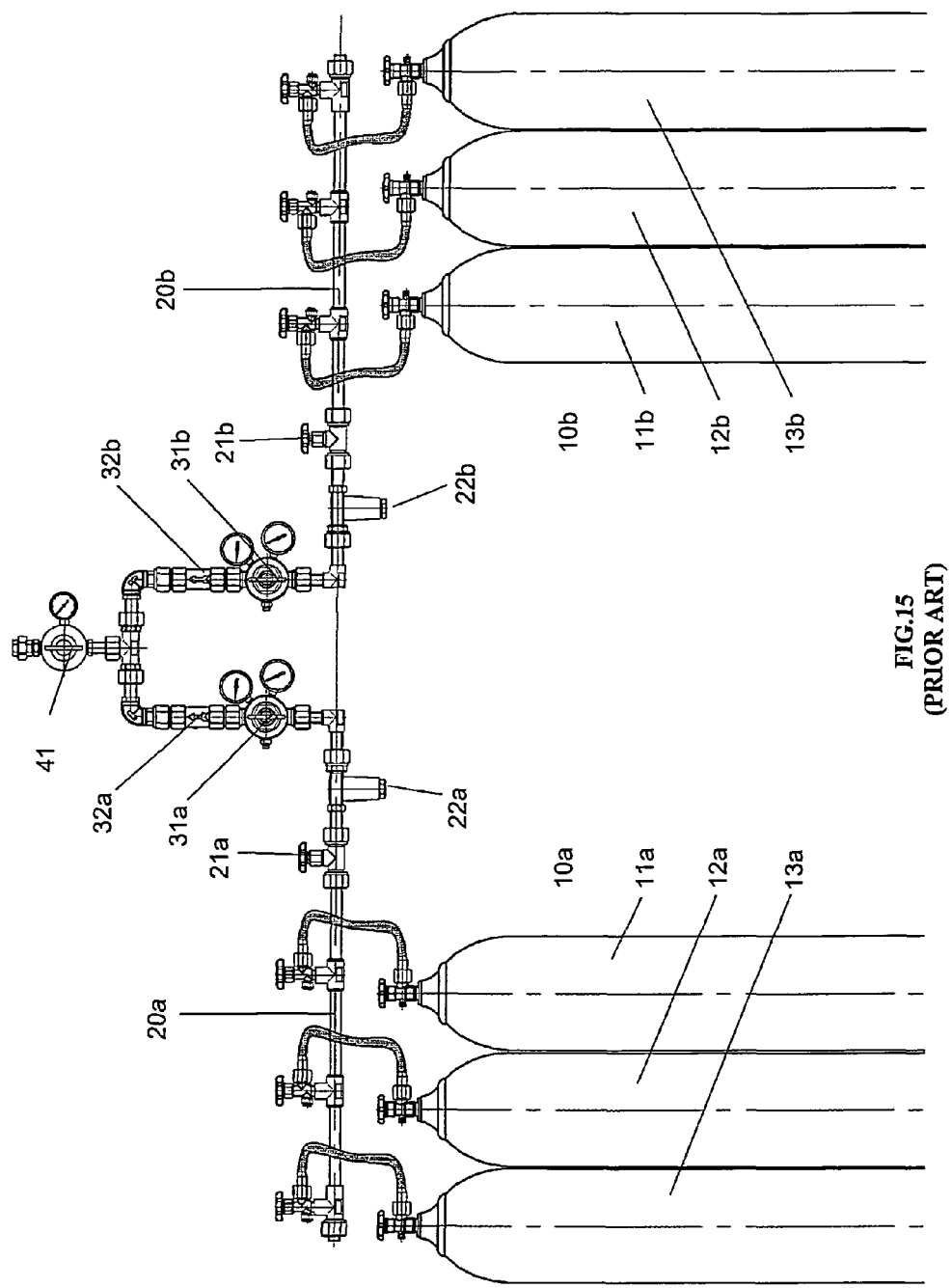
FIG. 15 shows the currently used manifold where gas sources are switched manually.
Figure 16:
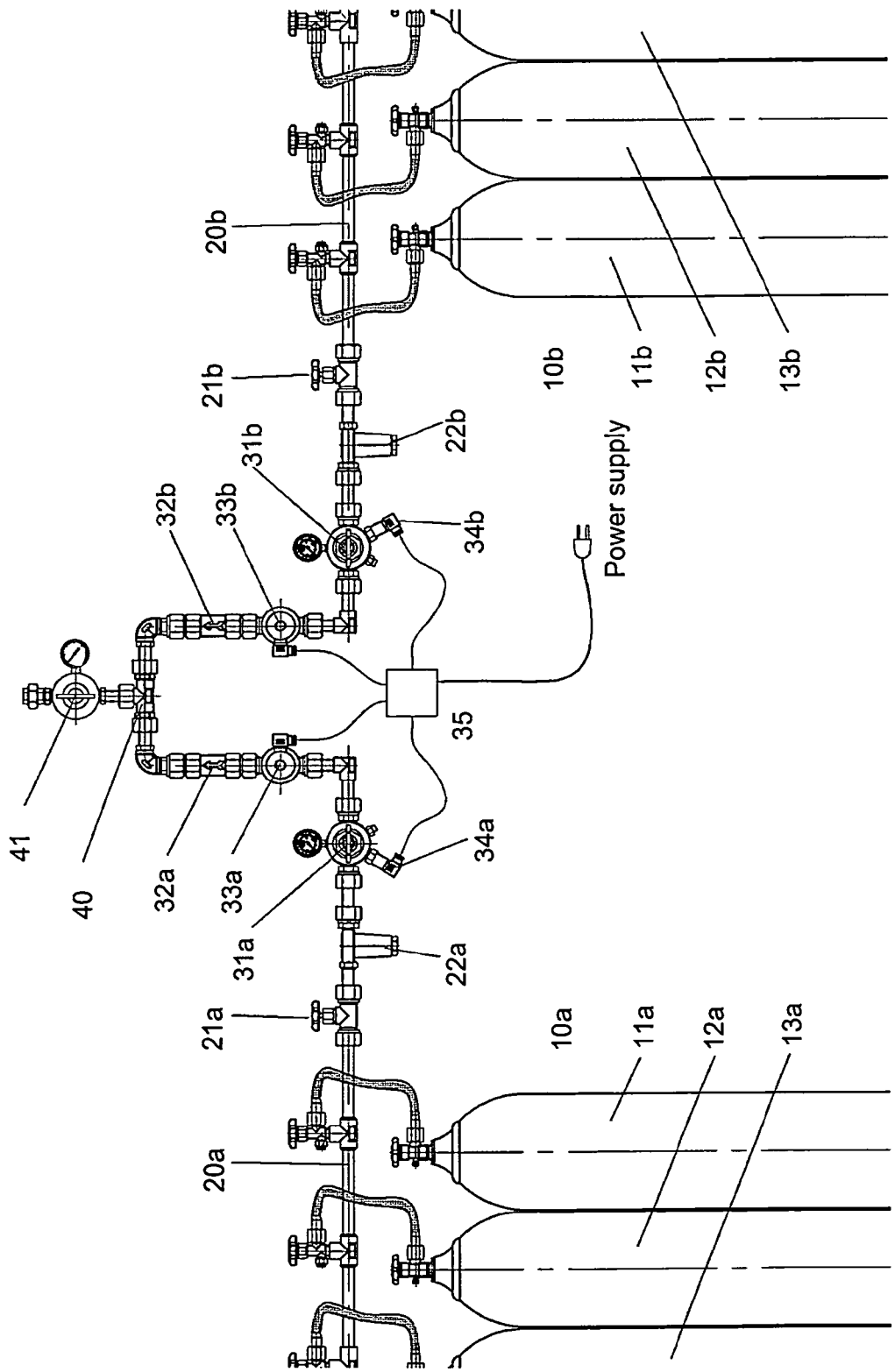
FIG. 16 shows the currently used manifold where gas sources are switched by automatic electrically controlled operation.

As the first side is continuously supplying gas, the gas source is consumed and the pressure of the first gas source starts to decrease (please refer to the background of the invention in FIG. 15 and FIG. 16). When the pressure $P_1$ of the first side decreases to a predetermined switch pressure $P_0$ (i.e. $P_0/P_2=d^2/D^2$), the thrust at the two sides of the spool 200 are equal and the resultant force on the spool is equal to zero. The pressure $P_1$ of the first side continues to decrease further and the direction of the resultant force changes to the left direction and the spool starts to move to the left slowly. As illustrated in FIG. 3, when the spool 200 moves to a position where the outlet port of the second outlet connection channel 203b just passes over the second outlet sealing ring 301b, the spool 200 closes the second control terminal. Thereafter, the second outlet connection channel 203b connects the outlet channel 105 and the second transition cavity 106b. The pressure of the second transition cavity 106b increases and the upthrust of the spool 200 quickly increases. At the same time, the first inlet port 101a continues to supply gas and the pressure of the first side continues to decrease. The pressure received by the spool still maintains at around $(P-P_0)\times\pi d^2/4$. The second operation indication terminal 109a releases pressure instructions.

Figure 4:
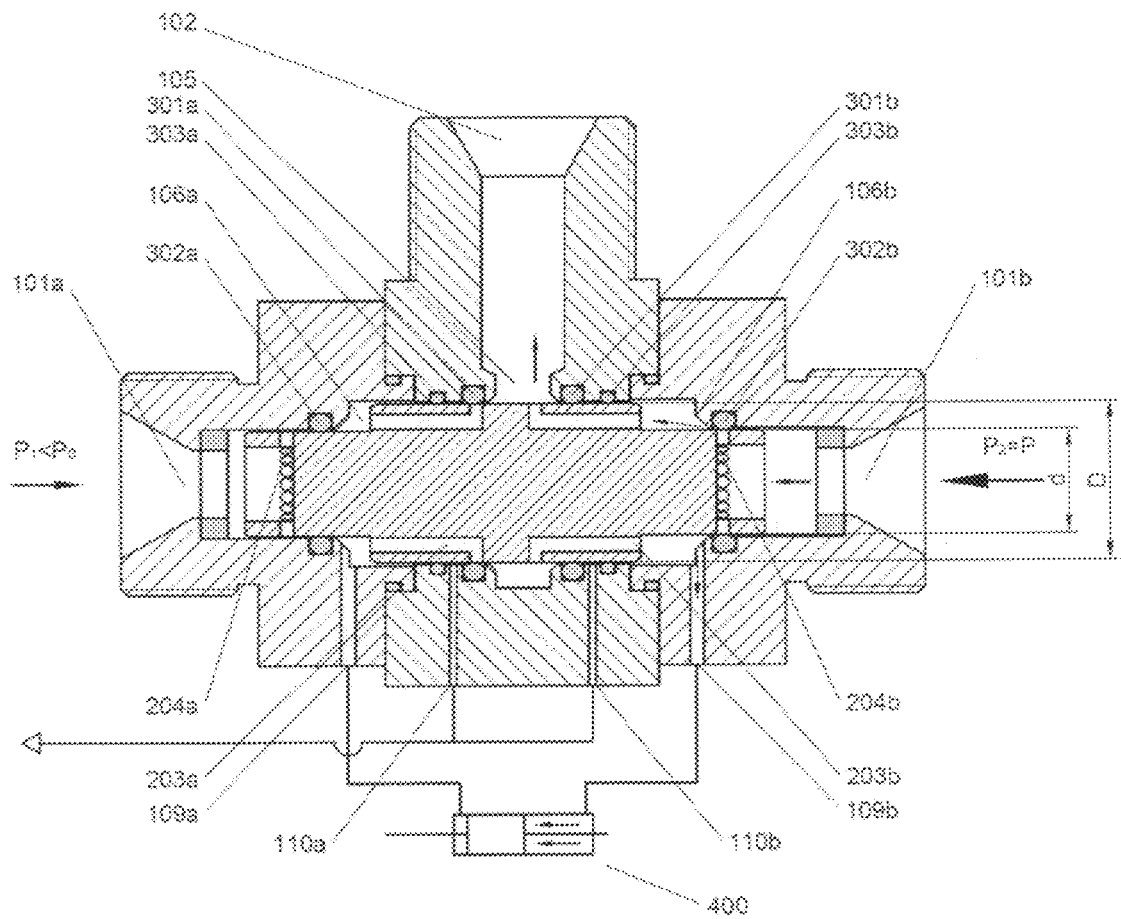
FIG. 4 shows the cross sectional view of phase 1 of the switch process of the dual gas source changeover valve according to the first embodiment of the present invention.

FIG. 4 shows the cross sectional view of phase 1 of the switch process of the dual gas source changeover valve 1 according to the first embodiment of the present invention. As illustrated above, under the sudden increase of the thrust action, the spool 200 quickly moves to the left side and passes over the middle. It first closes the first inlet connection channel 204a and then opens the second inlet connection channel 204b. The second side starts to supply gas.

Figure 5:
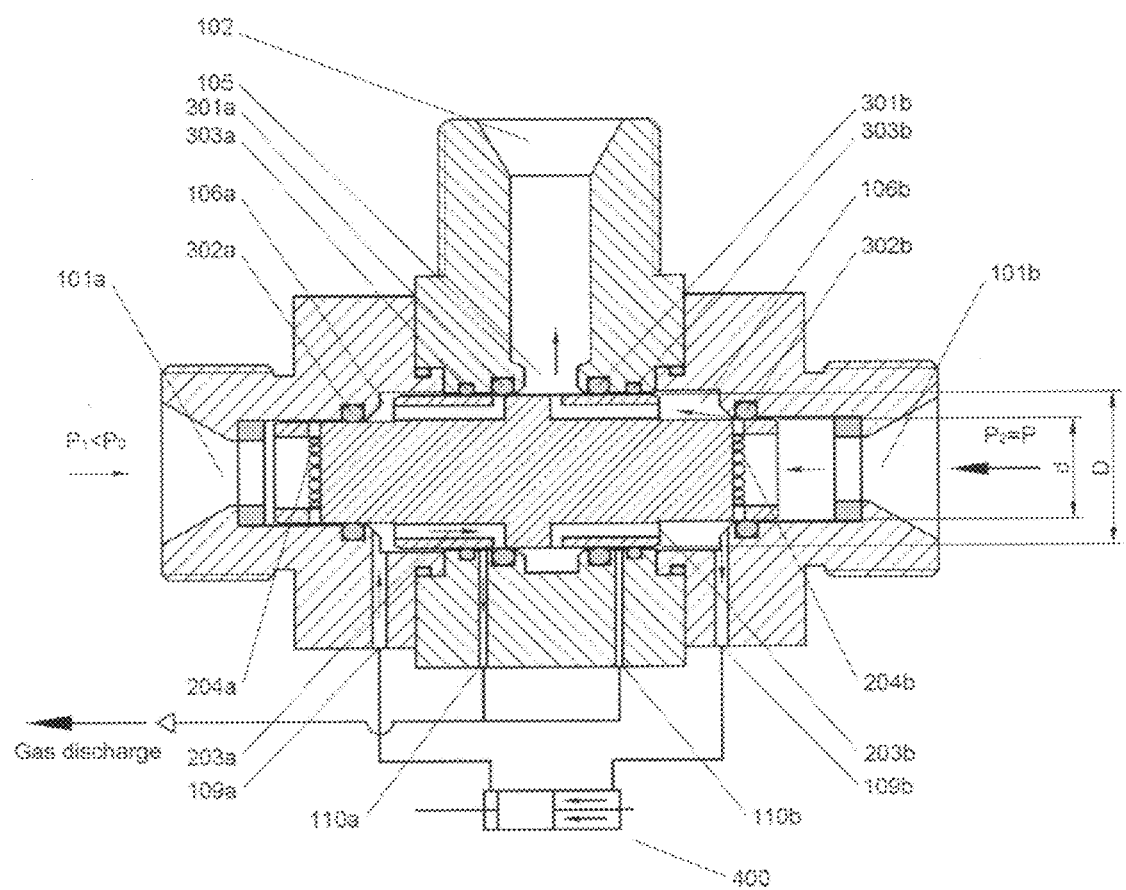
FIG. 5 shows the cross sectional view of phase 2 of the switch process of the dual gas source changeover valve according to the first embodiment of the present invention.

FIG. 5 shows the cross sectional view of phase 2 of the switch process of the dual gas source changeover valve 1 according to the first embodiment of the present invention. Immediately following the disconnection between the first transition cavity 106a and the outlet channel 105, the first outlet connection channel 203a connects the first transition cavity 106a and the first control terminal 110a. The first inlet port 101a and the outlet port 102 are completely disconnected. The first control terminal 110a contacts with zero pressure and releases the pressure within the first transition cavity 106a. The first operation indication terminal 109a is at zero pressure. The pressure received by the spool 200 continues to increase to around $(P\times\pi D^2/4-P_0\times\pi d^2/4)$ and the direction of the resultant force is to the left direction until the spool 200 moves to the first terminal end. The operation indication means 400 also undergoes switching immediately.

Figure 6:
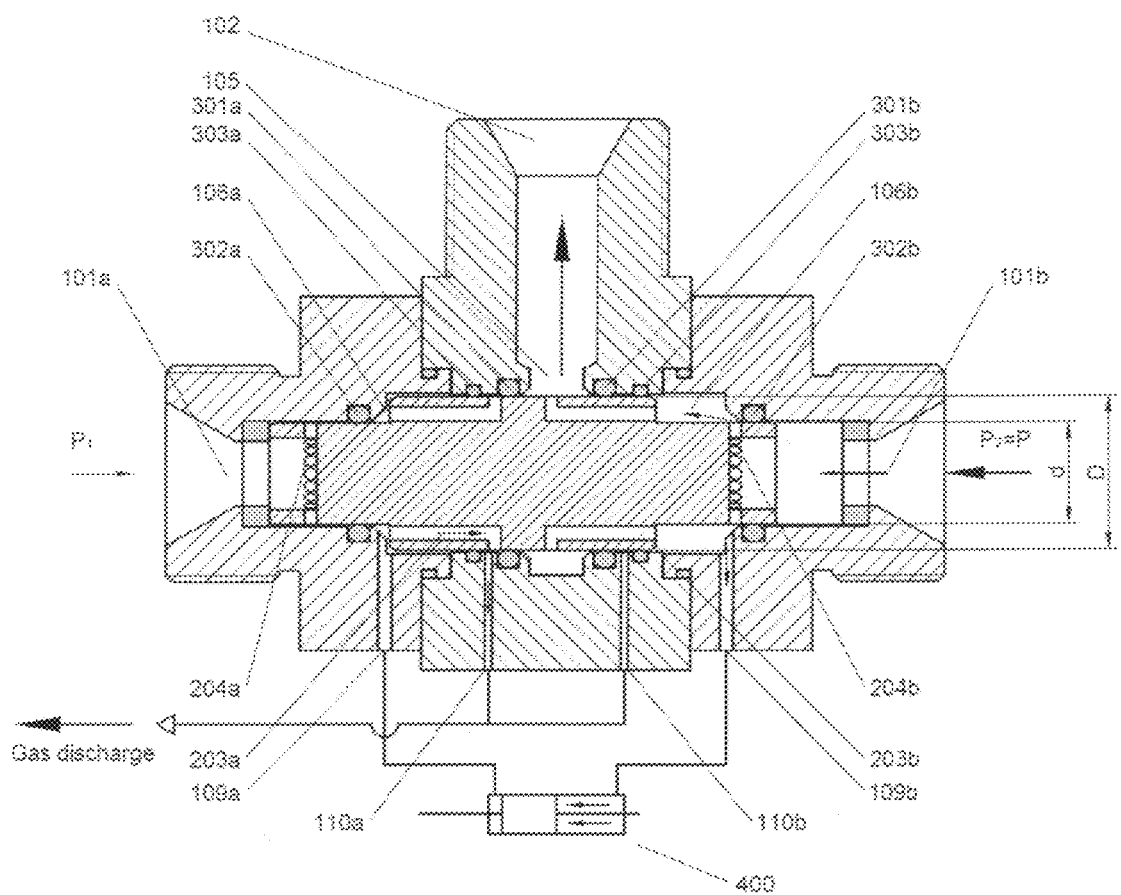
FIG. 6 shows the cross sectional view of the dual gas source changeover valve after the switch process is complete when the spool is within the second side of the valve body and the second side supplies gas according to the first embodiment of the present invention.

FIG. 6 shows the cross sectional view of the dual gas source changeover valve 1 after the switch process is complete and the second side supplies gas according to the first embodiment of the present invention. After the first inlet port is connected again to a gas source of operation pressure P, the spool 200 is still receiving pressure $P\pi(D^2-d^2)/4$ to the left direction and the second side continues to operate. A switch operation cycle is thereby complete.

As shown above, when a switch process occurs in the changeover valve, the pressures at the two sides approximately equal to the area ratio of the areas of the large-section and the small-section, that is, $P/P_0 \approx D^2/d^2$. In actual use, the area ratio is determined by the property of the gas source to ensure reliability of the switch process.

Figure 7:
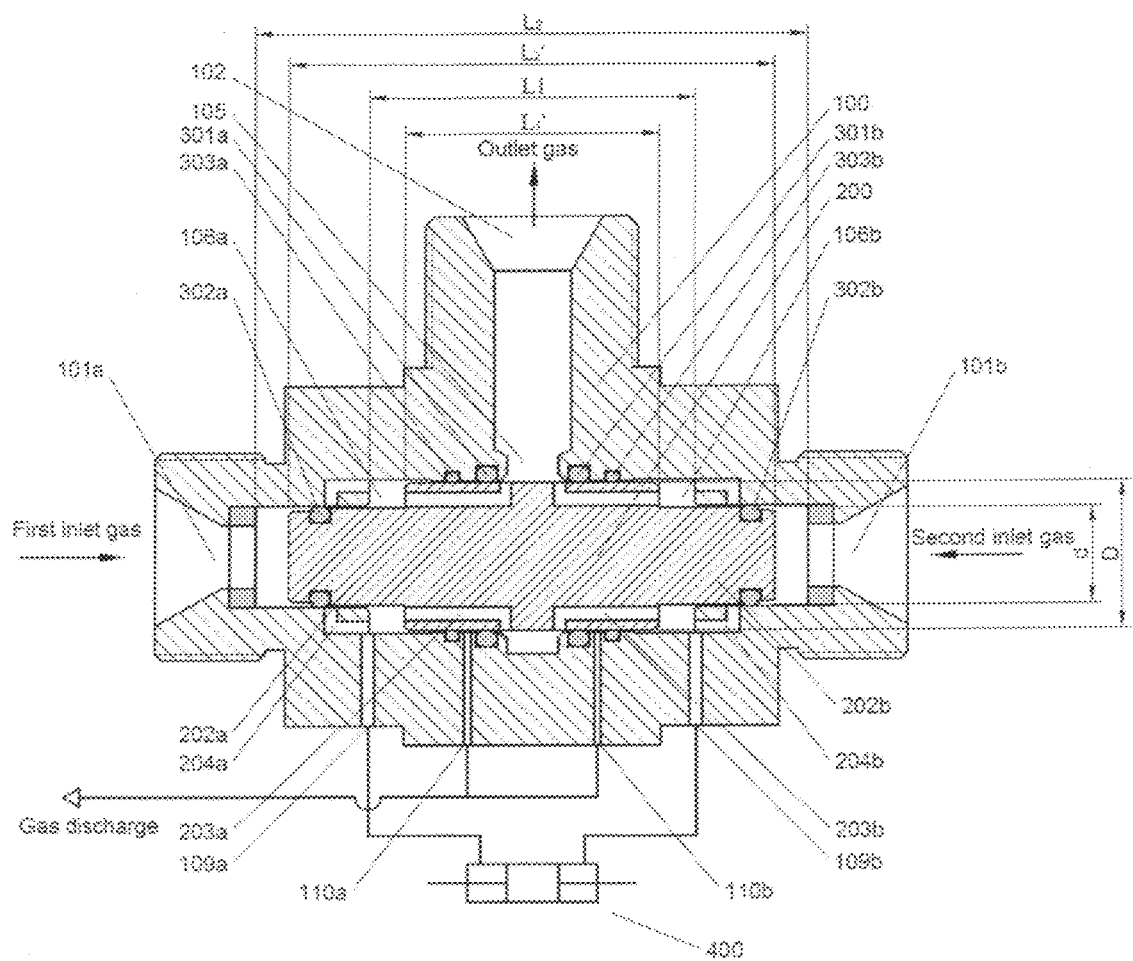
FIG. 7 shows the cross sectional view of the dual gas source changeover valve when the two sides are not connected to the pressure gas source and the spool is at the middle according to the second embodiment of the present invention.

FIG. 7 shows the cross sectional view of the dual gas source changeover valve when the two sides are not connected to the pressure gas source and the spool is at the middle according to the second embodiment of the present invention.

As illustrated in FIG. 7, the second embodiment of the present invention is basically the same as the first embodiment, except that the positions of the first inlet connection channel 204a and the second inlet connection channel 204b and the first inlet sealing ring 302a and the second inlet sealing ring 302b are different from the first embodiment. The inlet connection channels 204a and 204b are disposed on the cavity of the valve body 100 instead of on the spool 200, and the inlet sealing rings 302a and 302b are disposed on the spool 200 instead of on the valve body 100.

The working mechanism and operation of the second embodiment are identical to those of the first embodiment and attain results basically identical to those of the first embodiment, which will not be repeated here.

Figure 8:
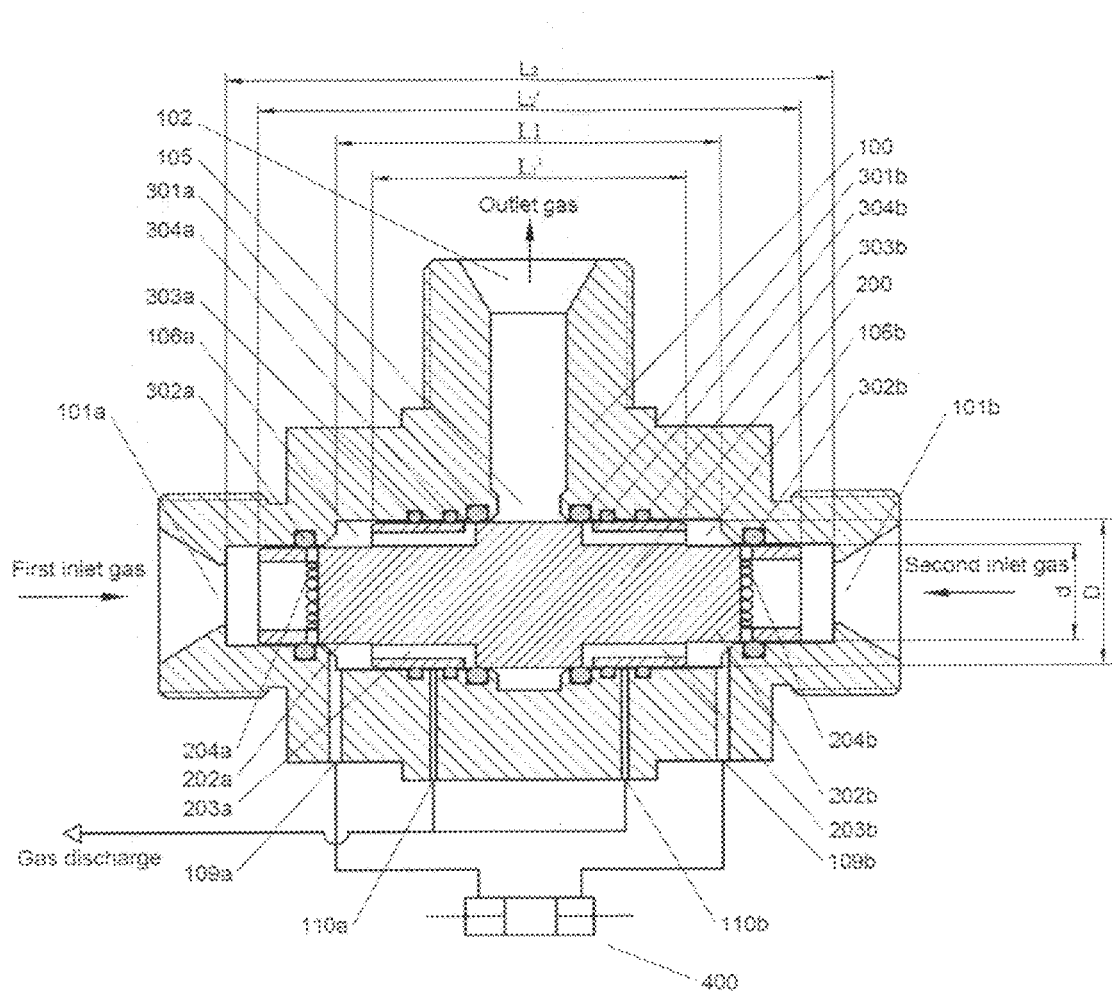
FIG. 8 shows the cross sectional view of the dual gas source changeover valve when the two sides are not connected to the pressure gas source and the spool is at the middle according to the third embodiment of the present invention.
Figure 9:
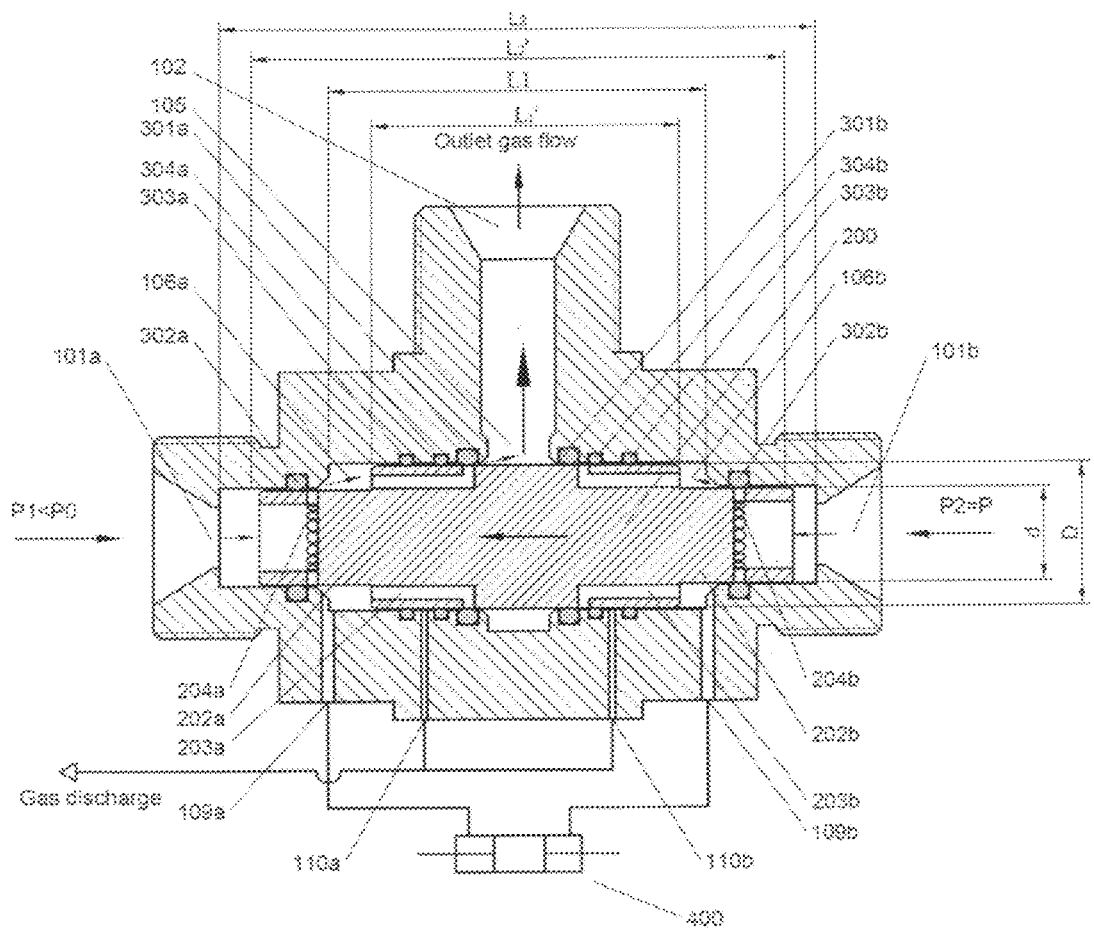
FIG. 9 shows the cross sectional view of the switch process of the dual gas source changeover valve according to the third embodiment of the present invention.

FIG. 8 shows the cross sectional view of the dual gas source changeover valve 3 when the two sides are not connected to the pressure gas source and the spool is at the middle according to the third embodiment of the present invention. FIG. 9 shows the cross sectional view of the switch process of the dual gas source changeover valve 3 according to the third embodiment of the present invention.

As illustrated in FIG. 8, the structure and operation principle of the third embodiment of the present invention is basically the same as the first embodiment, except that there is additionally disposed a first auxiliary outlet sealing ring 304a and a second auxiliary outlet sealing ring 304b on the cavity of the valve body 100, that is, the width of the outlet sealing ring is increased. The relative axial dimensions of the valve body 100, the spool 200 and other components of the channels are adjusted accordingly.

When the spool 200 is at the middle of the cavity of the valve body 100, the inlet channels at the two sides connects the transition cavities and the inlet ports of the same side respectively, and the transition cavities at the two sides and the outlet port are disconnected. This is different from the first and second embodiments.

As illustrated in FIG. 9, the difference between this embodiment and the first embodiment is that: when the spool 200 undergoes switching, the gas pressure of the first gas source decreases so that the spool 200 starts to move slowly to the left. When the spool 200 moves to a position where the outlet port of the second inlet connection channel 204b just passes over the second inlet sealing ring 302b, the second transition cavity 106b first connects with the second inlet port 101b and the second outlet connection channel 203b is still closed. At the same time, the first inlet port 101a continues to supply gas and the pressure of the first side continues to decrease. As illustrated in FIG. 9, the pressure within the second transition cavity 106b quickly increases and the pressure received by the spool 200 suddenly increases to around $(P-P_0) \times \pi D^2/4$ and the same pressure state is maintained throughout the whole switch process. Under the action of the suddenly increased thrust, the spool 200 quickly moves towards the first side and passes over the middle. It first closes the first outlet connection channel 203a and then opens the second outlet connection channel 203b, and the second side starts to supply gas. The spool 200 continues to move and the first inlet connection channel 204a is disconnected and the first outlet connection channel 203a connects the first transition cavity 106a and the first control terminal 110a. The first control terminal 110a contacts with zero pressure and releases the pressure within the first transition cavity. The first operation indication terminal 109a is at zero pressure. The pressure received by the spool 200 continues to increase to around $(P \times \pi D^2/4 - P_0 \times \pi d^2/4)$ until the spool 200 moves to the first terminal end. The operation indication means 400 also undergoes switching immediately. A switch operation cycle is thereby complete.

When compared to the first embodiment, the width of the outlet sealing rings is increased and the axial dimensions of the valve are increased. Since the inlet pressure first enters the transition cavity during the switch process, the upthrust $((P-P_0) \times \pi D^2/4)$ received by the spool is larger that the upthrust $((P-P_0) \times \pi d^2/4)$ in the first embodiment.

Figure 10:
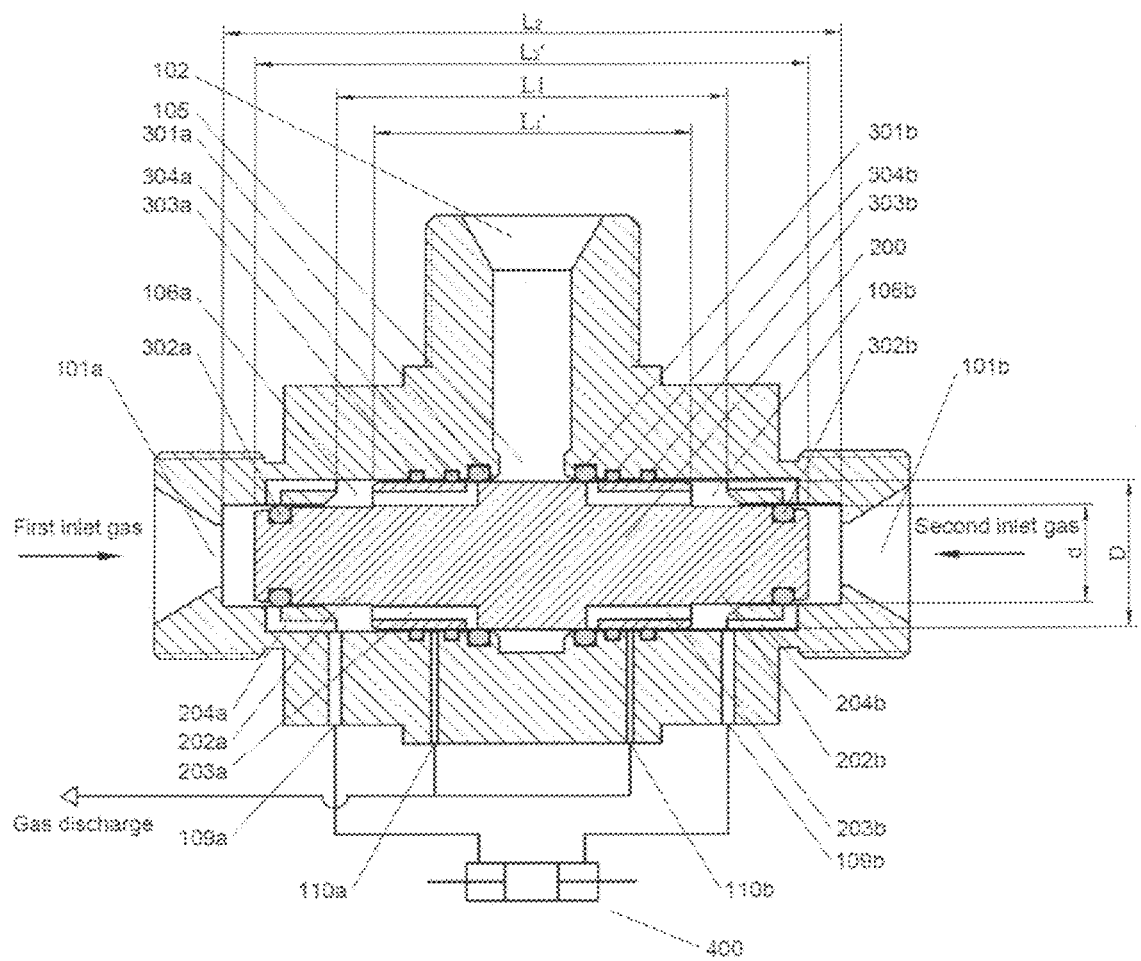
FIG. 10 shows the cross sectional view of the dual gas source changeover valve when the two sides are not connected to the pressure gas source and the spool is at the middle according to the fourth embodiment of the present invention.

FIG. 10 shows the cross sectional view of the startup state of the changeover valve 4 according to the fourth embodiment of the present invention.

The fourth embodiment of the present invention is basically the same as the third embodiment, except that the positions of the first inlet connection channel 204a and the second inlet connection channel 204b and the first inlet sealing ring and the second inlet sealing ring are different from the first embodiment. The inlet connection channels 204a, 204b are disposed on the cavity of the valve body 100 instead of on the spool 200, and the inlet sealing rings are disposed on the spool 200. Therefore, this embodiment can attain basically the same results as in the third embodiment.

Figure 11:
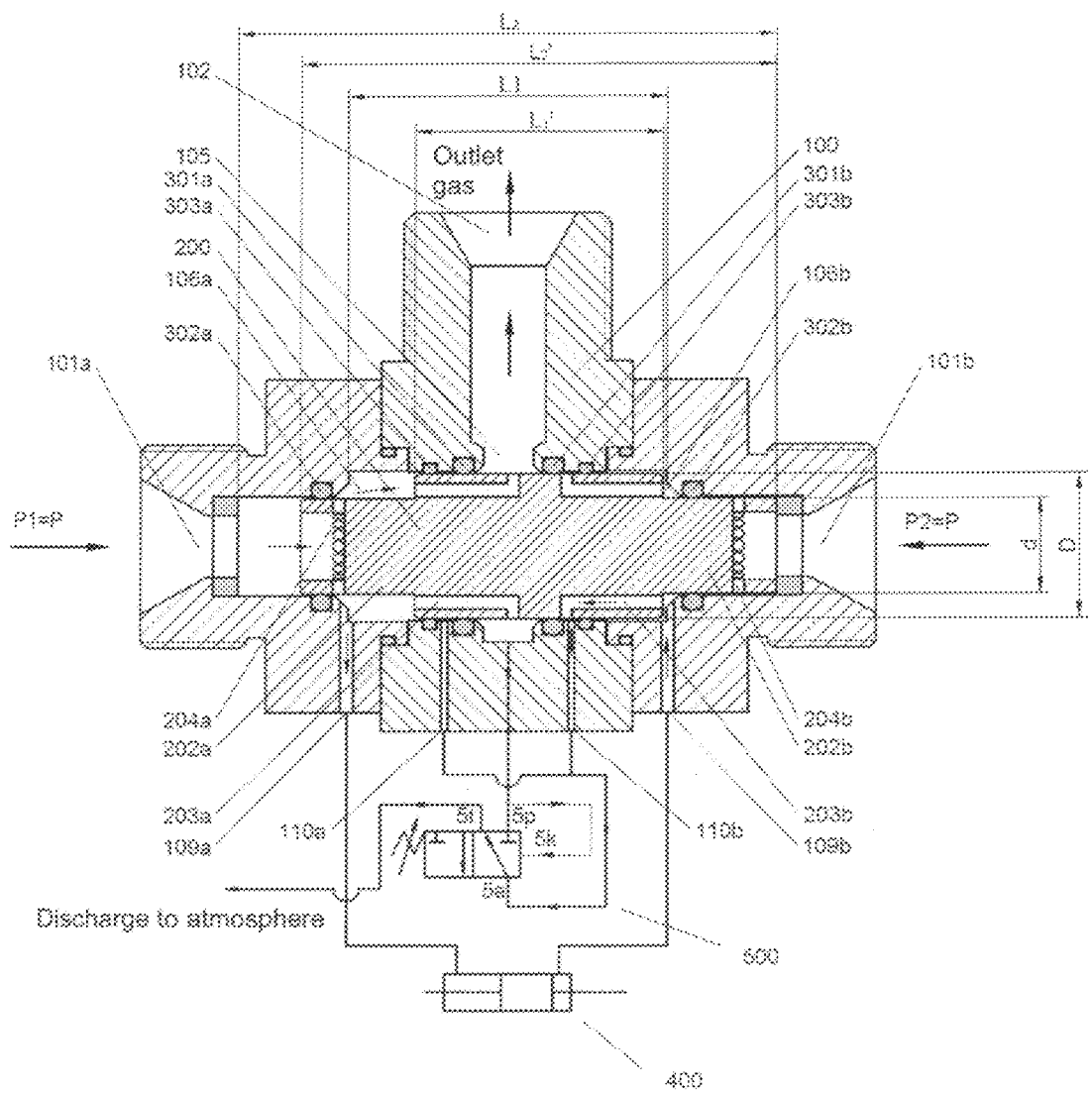
FIG. 11 shows the cross sectional view of the dual gas source changeover valve when one side is supplying gas and the other side is standing by according to the fifth embodiment of the present invention.
Figure 12:
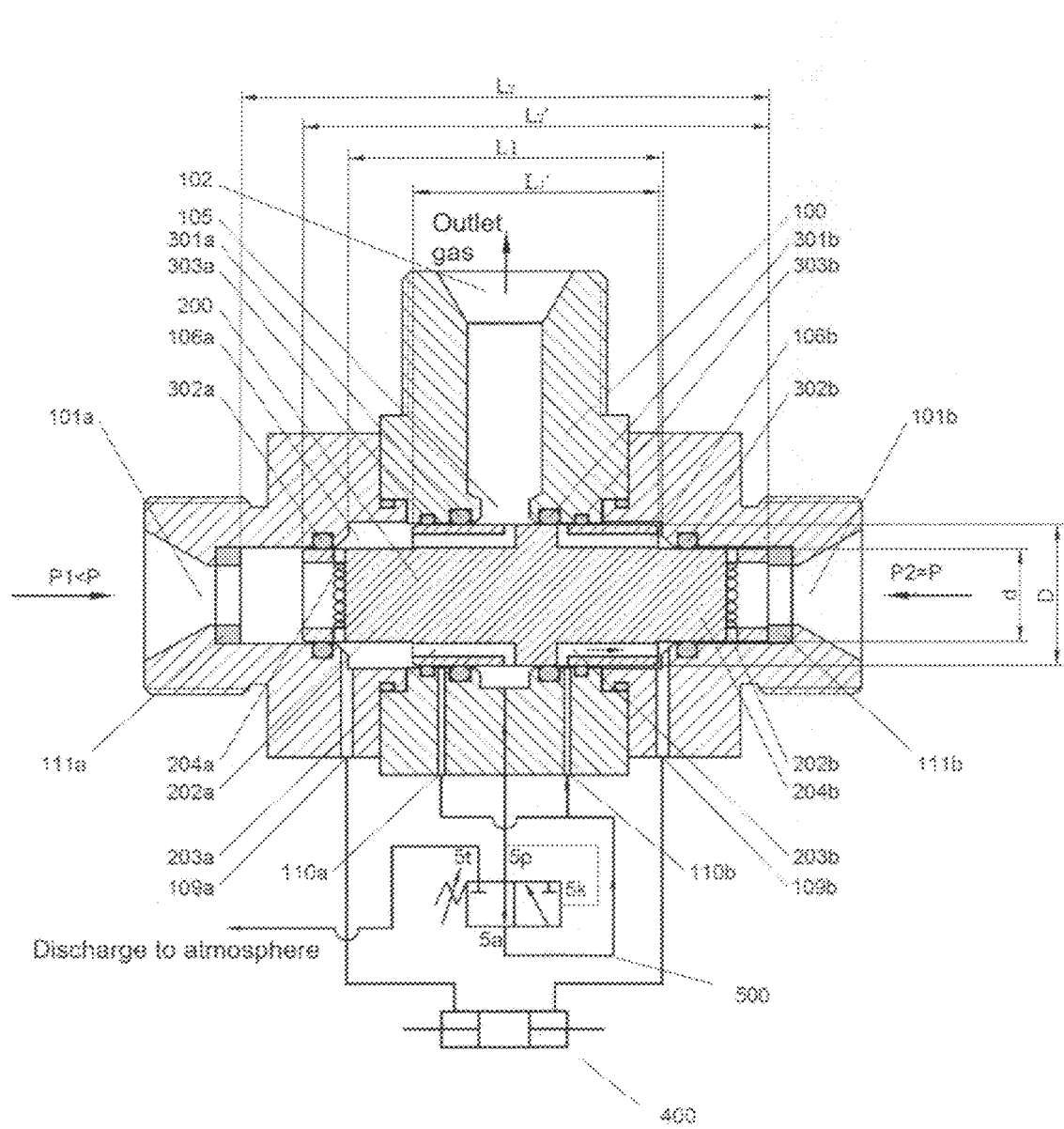
FIG. 12 shows the cross sectional view of the dual gas source changeover valve undergoing gas switching according to the fifth embodiment of the present invention.

FIG. 11 shows the cross sectional view of the dual gas source changeover valve 5 when one side is supplying gas and the other side is standing by according to the fifth embodiment of the present invention. FIG. 12 shows the cross sectional view of the dual gas source changeover valve undergoing gas switching according to the fifth embodiment of the present invention.

Based on the structures of the first to fourth embodiments, there is an additional regulation means 500 in the fifth embodiment. The regulation means 500 comprises connection outlet ports and control channels and is used to control the introducing and discharge of pressure into the control channels. The regulation means 500 is a regulation means with adjustable pneumatically controlled 2-position 3-way reversing valve. The regulation means is used to set the switch pressure of the dual gas source supply changeover valve. When the pressure of the outlet port is lower than the predetermined valve of the regulation means, the regulation means 500 introduces output pressure into the control channel and causes the spool 200 to change direction. When the pressure of the gas source at the supplying side is normal and the pressure of the outlet port is higher than the predetermined value of the regulation means, the regulation means discharges the pressure in the control channel so that the spool maintains a single gas supplying side. According to the present invention, the pressure ratio of the dual gas source supply changeover valve during the switch process is no longer $P/P_0 = d^2/D^2$, but is regulated within the range from a pressure ratio which ensures guaranteed and reliable switching to $d^2/D^2$.

FIG. 11 shows the valve body 100, the spool 200 and the regulation means 500 of the dual gas source changeover valve 5 at the normal gas supplying state when the first gas source is supplying gas and the second gas source is standing by according to the fifth embodiment of the present invention.

As illustrated in FIG. 11, the regulation means 500 is a 2-input 1-output and adjustable pneumatic 2-position 3-way reversing valve. The pressure port 5p and the gas control port 5k are connected to the outlet channel 105 of the changeover valve. The discharge outlet 5t opens towards the atmosphere. The outlet port 5a connects to the control terminals 110a, 110b of the changeover valve.

When the pressure of the gas control port 5k is higher than the predetermined pressure (spring force), the outlet port 5a and the discharge outlet 5t become connected and the pressure within the control terminals 110a, 110b is discharged. When the pressure of the gas control port is lower than the predetermined pressure, the outlet port 5a and the pressure port 5p become connected and the external pressure is introduced to the control terminals 110a, 110b so that the spool 200 switches earlier.

The fifth embodiment of the present invention is basically the same as the above four embodiments. The identical parts are not repeated. The difference is the involvement of the regulation means 500 in the switching process of the spool 200, detailedly described as follows:

As illustrated in FIG. 12, the first control terminal 110a, the second control terminal 110b no longer receive zero pressure, but are controlled by the regulation means 500. The predetermined pressure of the regulation means 500 is P'. When the pressure of the outlet gas of the changeover valve is higher than the predetermined pressure P', the output port 5a and the discharge outlet 5t become connected and the pressure within the control terminals 110a, 110b is discharged. When the output pressure is lower than the predetermined pressure P', the outlet port 5a and the pressure port 5p become connected and the external pressure is introduced to the control terminals 110a, 110b so that the spool 200 switches earlier.

Therefore, in the above four embodiments, when the pressure of the first gas source decreases, the output pressure also decreases. When the output pressure decreases to the predetermined pressure P', the regulation means 500 introduces external pressure towards the control terminals. As illustrated in FIG. 8, the pressure received by the spool 200 suddenly increases $P' \times \pi (D^2 - d^2)/4$. Under the sudden increase of the thrust action, the spool 200 quickly moves to the first side on the left. Unlike the above four embodiments, when the changeover valve switches gas source, the pressure ratio of the two sides has to be approximately equal to the area ratio of the large-section and small-section, i.e. $P_2/P_1 \approx D^2/d^2$. When the predetermined pressure is very small, the regulation means 500 does not function, and the pressure ratio during switching is still similar to the area ratio of the large-section and small-section, i.e. $P/P_0 \approx D^2/d^2$. Its functions are similar to the above four embodiments. To guarantee reliable gas source switching when the output pressure is decreasing, the predetermined pressure value should be lower than the normal operation pressure P by a certain extent.

The regulation means 500 can be used in any one of the above embodiments 1, 2, 3 or 4 and attains basically the same functions and purposes.

Figure 13:
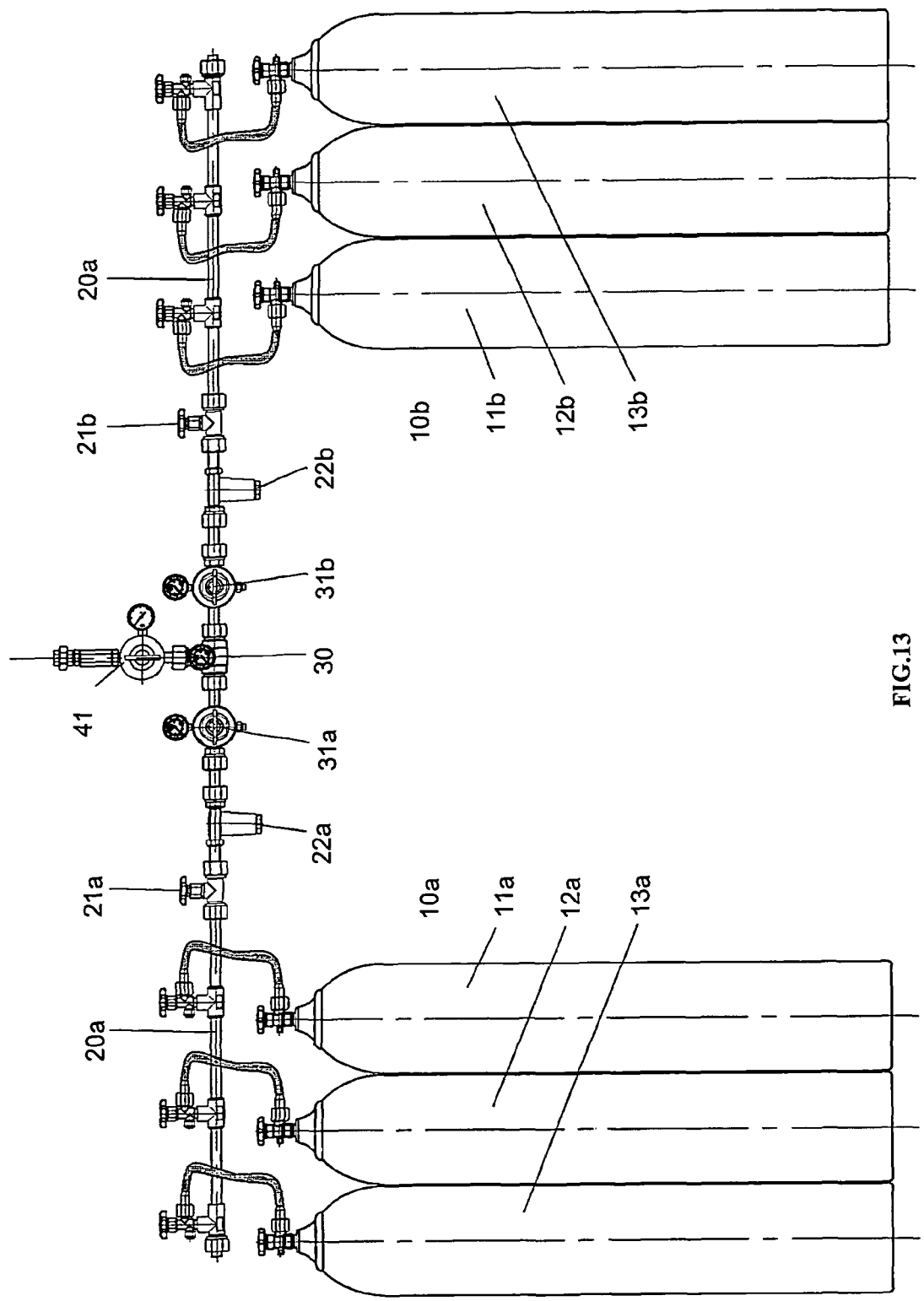
FIG. 13 shows how the dual gas source changeover valve of the above embodiments of the present invention is applied in a dual gas source gas supply system.

FIG. 13 shows how the dual gas source changeover valve of the above embodiments is applied in a dual gas source gas supply system.

As illustrated in FIG. 13, the dual gas source changeover valve of the above embodiments can be applied to various scenarios of dual gas supply. For example, uninterrupted gas supply is required for gas supply systems in many fields in the industrial field and medical field. Depending on the pressure requirements of the gas supplied, the major and minor diameters D and d of the step-type spool 200 is selected. To attain uninterrupted gas supply, two gas sources are utilized. One of the gas sources is the primary bank and the other is the reserve bank. When the pressure of the primary bank decreases to a predetermined value, the gas source will be automatically switched by the changeover valve according to any one of the above embodiments of the present invention using the pressure differential of the gas flows, i.e. the reserve bank starts to supply gas and becomes the primary bank, and the original primary bank becomes the reserve bank after the gas source whose pressure has decreased to the predetermined value is replaced. Uninterrupted gas supply to the output end is attained by repeated switching as above. It should be emphasized that a pressure reduction valve is installed between each gas source and the changeover valve according to any one of the above embodiments of the present invention, so as to ensure normal gas supply phases. The pressure of the gas sources of the two sides of the changeover valve are basically identical. The operation is detailedly described as follows.

The predetermined output pressure $P_1'$ of the pressure reduction valve is $D^2/d^2$ times of the switch pressure $P_0$. When the primary bank starts operation, the pressure of the gas source is higher than the predetermined output pressure $P_1'$ of the pressure reduction valve and the pressure reduction valve lowers the pressure of the gas source to $P_1'$ and transport gas to the changeover valve. The pressure of the two sides of the changeover valve is both $P_1'$. As mentioned in the embodiments above, the side which is connected first operates first.

When the primary bank depletes and the pressure drops below the predetermined output pressure $P_1'$ of the pressure reduction valve, the pressure reduction valve loses its pressure reduction function and gas flows without any hindrance through the inlet and outlet ports of the pressure reduction valve. The actual output pressure $P_1$ of the pressure reduction valve is approximate to the pressure of the gas source and the pressures of the two sides of the changeover valve change. When the pressure of the primary bank continues to decrease so that the pressure of the working side of the changeover valve decreases to the switch pressure $P_0$, as mentioned in the above embodiments, switching occurs at the changeover valve. The reserve bank starts to supply gas and the depleted gas source is replaced and becomes the reserve bank. Uninterrupted gas supply to the user end is attained by repeated switching as above. The predetermined output pressure of the pressure reduction valve is normally 1-3 MPa.

Figure 14:
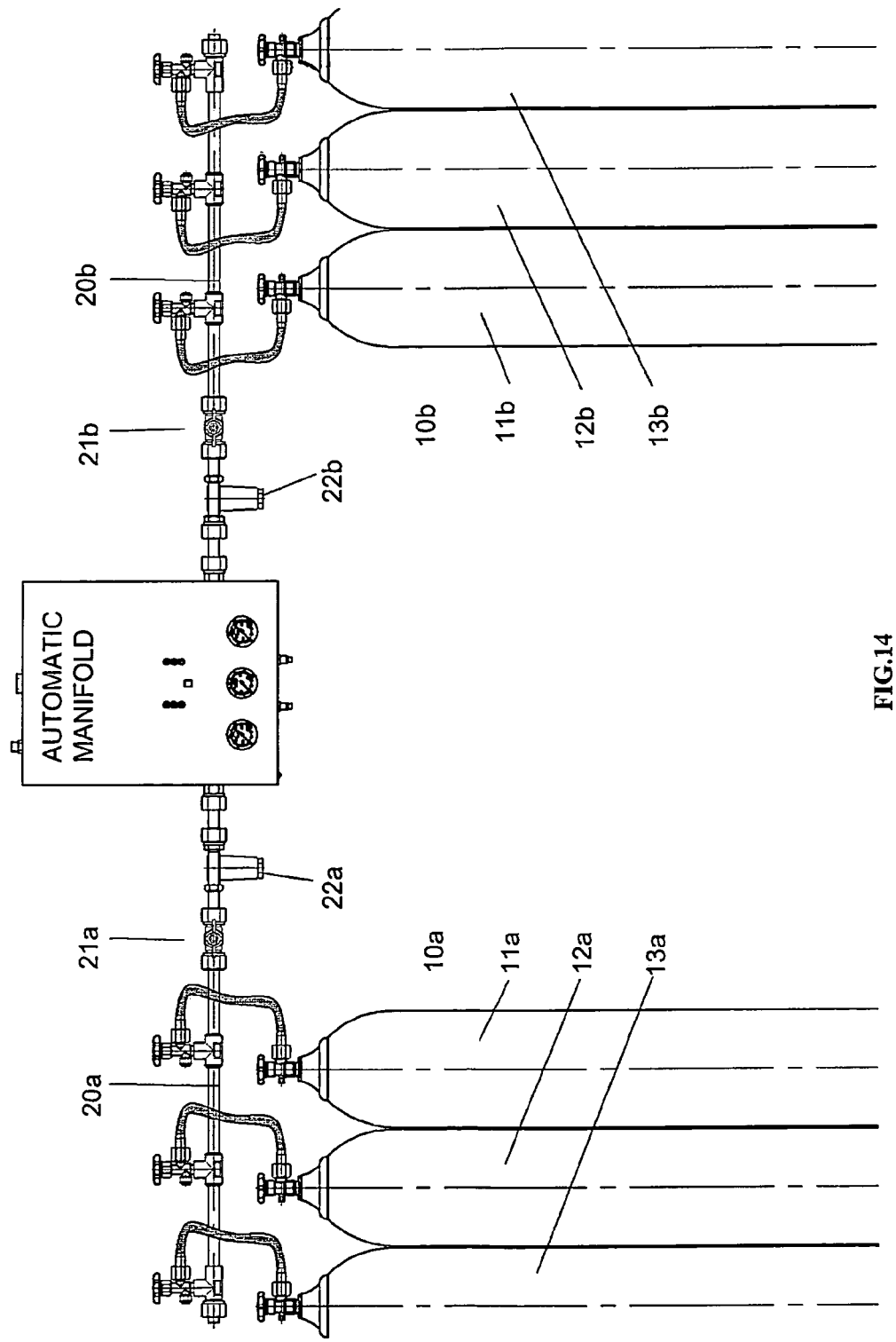
FIG. 14 shows how the dual gas source changeover valve of the above embodiments of the present invention is applied in a dual gas source control cabinet.

FIG. 14 shows how the dual gas source changeover valve of the above embodiments of the present invention is applied in a dual gas source control cabinet.

To attain centralized management of the pressure reduction and gas switching process of the dual gas source gas supply, the changeover valve of the above embodiments of the present invention can be disposed in a control cabinet. The control cabinet may also comprise various apparatus and meters required by the pressure reduction valve and for gas flow control.

In the five embodiments of the present invention, by the combination of simply structures of the valve body and the spool, two inlet cavities, one outlet channel and two transition cavities disposed between the two inlet cavities and the outlet channel are formed. Further, automatic switching between the two gas sources under the predetermined pressure is attained by the selective connection or disconnection between one of the transition cavities and the two inlet cavities or the outlet channel by the inlet connection channels and outlet connection channels disposed on the valve body and the spool.

In the fifth embodiment of the present invention, by the combination of simply structures of the valve body and the spool, two inlet cavities, one outlet channel and two transition cavities disposed between the two inlet cavities and the outlet channel are formed. Further, automatic switching between the two gas sources under the predetermined pressure is attained by having the gas flow switching device selectively introducing gas flow into the two transition cavities or connecting the two transition cavities with the atmosphere. On the other hand, the prestressing force of the spring can be adjusted by adjusting the screw and the switch pressure of the gas source can be adjusted. This widens the scope of application of the changeover valve.

When compared to traditional manual gas source switching method, the present invention enhances the reliability of timely switching of the gas supply system and reduces costs. It also enhances the automation level of the gas supply system.

When compared to traditional automatic electric gas source switching method, the present invention attains the same switching effect and can also guarantee automatic switching of the gas system during electricity cutoff. Therefore, the costs are greatly reduced.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A dual gas source changeover valve comprising:
    a valve body having a Tee housing with a T-shaped cavity, which comprises a first inlet port, a second inlet port axially disposed opposite to the first inlet port, and an outlet port perpendicularly disposed in middle of the axially disposed first inlet port and second inlet port, where the first inlet port, the second inlet port and the outlet port are in fluid communication;
    a spool having a structure relative to an axial passage of the cavity of the valve body between the first inlet port and the second inlet port, and which is slidably disposed within the valve body;
    characterized in that the cavity of the valve body comprises a large-section cavity in middle, a first valve body contraction segment, and a second valve body contraction segment axially disposed opposite to the first valve body contraction segment, where the first valve body contraction segment and the second valve body contraction segment are small-section cavities which are co-axially disposed at and outwardly protrude from two ends of the large-section cavity respectively; the spool comprises a large-section cylindrical body in middle which has a cross section relative to the large-section cavity and axial dimensions smaller than axial dimensions of the large-section cavity; a first small-section segment and a second small-section segment which are co-axially disposed at and outwardly protrude from two ends of the large-section cylindrical body respectively have cross sections relative to the first valve body contraction segment and the second valve body contraction segment and axial dimensions which allow them to be disposed within the first valve body contraction segment and the second valve body contraction segment at any position inside the axial passage of the cavity;
    characterized in that end surfaces of the cavity of the valve body and the large-section cylindrical body of the spool form a first transition cavity between the first inlet port and the outlet port and a second transition cavity opposite to the first transition cavity and between the second inlet port and the outlet port; delivered gas is introduced into or discharged from the first transition cavity or the second transition cavity in order to control pressures of the two transition cavities, thereby selectively connecting or disconnecting the first inlet port, the first transition cavity and the outlet port or the second inlet port, the second transition cavity and the outlet port;
    characterized in that at least one outlet connection channel is disposed between the outlet port and the first transition cavity and between the outlet port and the second transition cavity.

2. The dual gas source changeover valve as in claim 1, further comprising:
    at least one inlet air-tight seal disposed between the first transition cavity and the first inlet port and between the second transition cavity and the second inlet port;
    at least one inlet connection channel disposed between the first inlet port and the first transition cavity and between the second inlet port and the second transition cavity;
    wherein when the spool is at a predetermined position, the at least one inlet connection channel on a side passes over the inlet air-tight seal on that side so that the inlet port on that side connects to the transition cavity on that side, and the at least one inlet connection channel on an other side disconnects the inlet port on that other side from the transition cavity on that other side by means of the at least one inlet air-tight seal on that other side.

3. The dual gas source changeover valve as in claim 2, further comprising:
    at least one outlet air-tight seal disposed between the first transition cavity and the outlet port and between the second transition cavity and the outlet port;
    wherein when the spool is at a predetermined position, the at least one outlet connection channel on a side passes over the outlet air-tight seal on that side so that the outlet port on that side connects to the transition cavity on that side, and the at least one outlet connection channel on an other side disconnects the outlet port on that other side from the transition cavity on that other side by means of the at least one outlet air-tight seal on that other side.

4. The dual gas source changeover valve as in claim 3, wherein the at least one outlet connection channel is disposed in a manner that it extends from a first end surface and a second end surface of the large-section cylindrical body of the spool respectively to periphery of the large-section cylindrical body of the spool.

5. The dual gas source changeover valve as in claim 3, wherein the at least one inlet connection channel is disposed in a manner that it extends from ends of the two small-section segments of the spool respectively to periphery thereof.

6. The dual gas source changeover valve as in claim 5, wherein recesses are respectively disposed on end surfaces of the two small-section segment of the spool, and at least one inlet connection channel connecting to the periphery of the two small-section segments are disposed on side walls of each of the recesses.

7. The dual gas source changeover valve as in claim 3, wherein the at least one inlet connection channel is disposed in a manner that the first inlet port and the second inlet port connect to the respective transition cavities through the valve body.

8. The dual gas source changeover valve as in claim 3, wherein when the spool slides within the valve body to the predetermined position, the at least one inlet connection channel of a side connects the inlet port and the transition cavity on that side; the transition cavity of that side and the outlet port are thereafter connected through the at least one outlet connection channel.

9. The dual gas source changeover valve as in claim 3, wherein when the spool of the present invention slides within the valve body to the predetermined position, the at least one outlet connection channel of a side connects the outlet port and the transition cavity on that side; the transition cavity of that side and the inlet port of that side are thereafter connected through the at least one inlet connection channel.

10. The dual gas source changeover valve as in any claim of claim 1 to claim 9, wherein the spool and the cavity of the valve body have cross sections in shape of circle.

11. The dual gas source changeover valve as in any claim of claim 1 to claim 9, wherein it also comprises an operation indication means which indicates gas switching state; the valve body also comprises a first passage connecting the first transition cavity to a side of the operation indication means and a second passage connecting the second transition cavity to an other side of the operation indication means.

12. The dual gas source changeover valve as in any claim of claim 1 to claim 9, wherein it also comprises at least one auxiliary air-tight seal disposed between the transition cavities and at least one outlet air-tight seal of two sides; the valve body between the outlet air-tight seals and the auxiliary air-tight seals of the two sides comprises a first external control passage and a second external control passage connecting to an external environment; the first external control passage connects to the external environment when the first transition cavity is disconnected from the outlet port, and the second external control passage connects to the external environment when the second transition cavity is disconnected from the outlet port.

13. The dual gas source changeover valve as in claim 12, wherein it also comprises connection, channels which connect the first external control passage and the second external control passage respectively to a gas discharge means or recovery means.

14. The dual gas source changeover valve as in claim 12, wherein it also comprises a gas switching regulation means which selectively connects or disconnects the outlet port to the first transition cavity and the second transition cavity; two ends of the gas switching regulation means are connected to the first external control passage and the second external control passage respectively.

15. A dual gas source gas supply control cabinet, which is characterized in that the control cabinet comprises the dual gas source changeover valve as in claim 1.

16. A dual gas source air supply system, which is characterized in that the dual gas source air supply system comprises the dual gas source changeover valve as in claim 1.

* * * * *